(12) United States Patent
Cummins

(10) Patent No.: US 8,876,130 B2
(45) Date of Patent: Nov. 4, 2014

(54) TRIANGULAR SHAPED BUCKET WITH RUST RESISTANT WHEELS

(76) Inventor: Wallace L. Cummins, Coatesville, PA (US)

( * ) Notice: Subject to any disclaimer, the term of this patent is extended or adjusted under 35 U.S.C. 154(b) by 124 days.

(21) Appl. No.: 13/134,517

(22) Filed: Jun. 9, 2011

(65) Prior Publication Data

US 2011/0304109 A1    Dec. 15, 2011

Related U.S. Application Data

(60) Provisional application No. 61/397,581, filed on Jun. 14, 2010.

(51) Int. Cl.
*B62B 5/00* (2006.01)
*B62B 3/12* (2006.01)
*B62B 3/10* (2006.01)

(52) U.S. Cl.
CPC . *B62B 3/12* (2013.01); *B62B 3/108* (2013.01); *B62B 2202/50* (2013.01)
USPC ......................................................... 280/79.5

(58) Field of Classification Search
USPC .......................................... 280/79.5; 220/754
See application file for complete search history.

(56) References Cited

U.S. PATENT DOCUMENTS

| | | | | |
|---|---|---|---|---|
| D136,896 | S * | 12/1943 | Woodward | D32/53 |
| 5,390,944 | A * | 2/1995 | Sherwin | 280/47.35 |
| 5,881,891 | A * | 3/1999 | Murphy, Jr. | 211/70.6 |
| 6,389,638 | B1 * | 5/2002 | Dickinson et al. | 15/261 |
| 2003/0217428 | A1 * | 11/2003 | Perelli | 15/260 |
| 2004/0188451 | A1 * | 9/2004 | Karlsson | 220/754 |
| 2009/0056052 | A1 * | 3/2009 | Davison | 15/264 |

* cited by examiner

*Primary Examiner* — John Walters
*Assistant Examiner* — James Triggs
(74) *Attorney, Agent, or Firm* — John F. A. Earley, III; Frank J. Bonini, Jr.; Harding, Earley, Follmer & Frailey, P.C.

(57) ABSTRACT

A bucket having a triangular shape wherein three side walls and a floor define a triangular interior volume, the bucket having wheels for facilitating moving the bucket from one location to another location, and there being a storage compartment provided in a sidewall of the bucket for storing signs, such as, for example, wet floor signs.

20 Claims, 8 Drawing Sheets

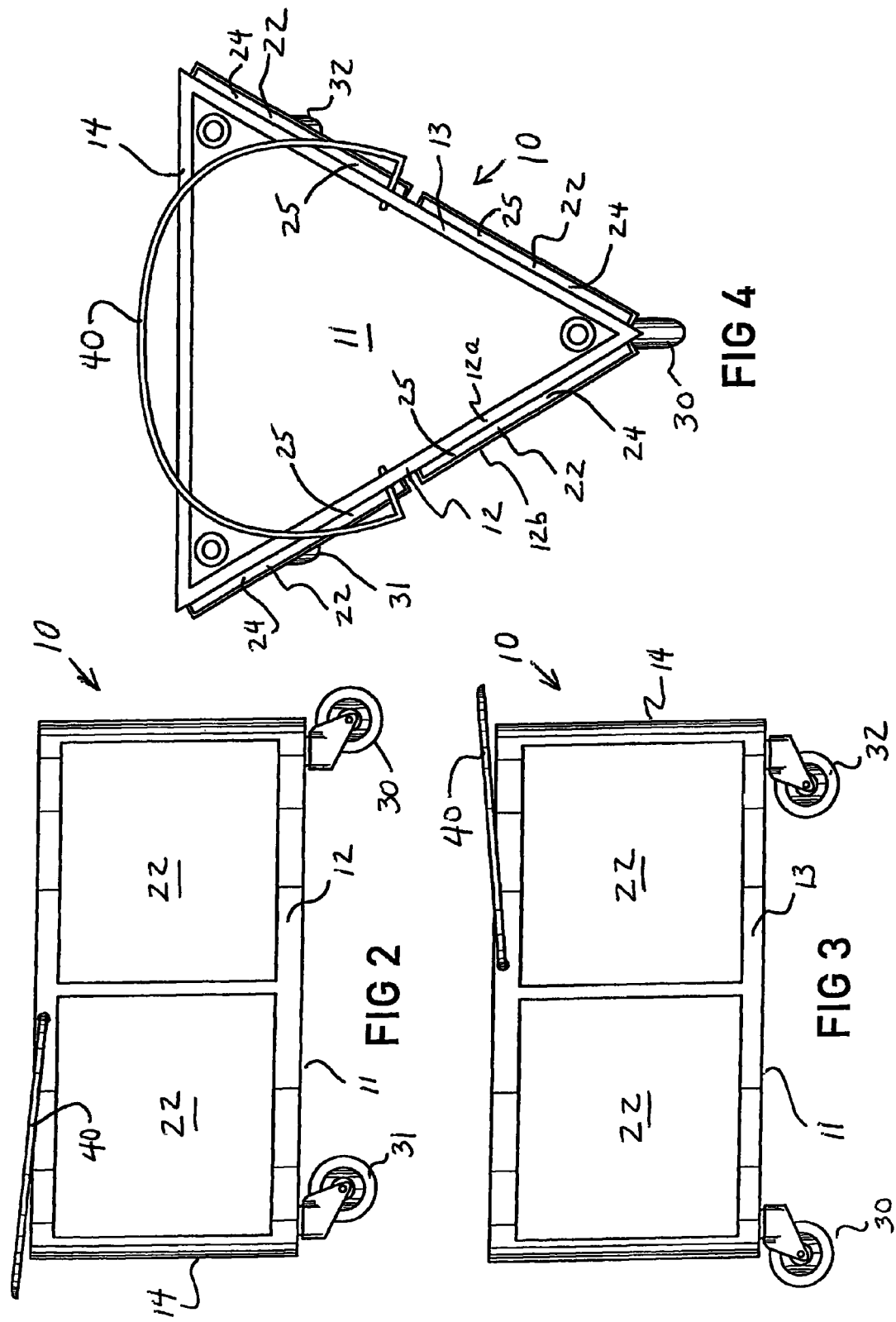

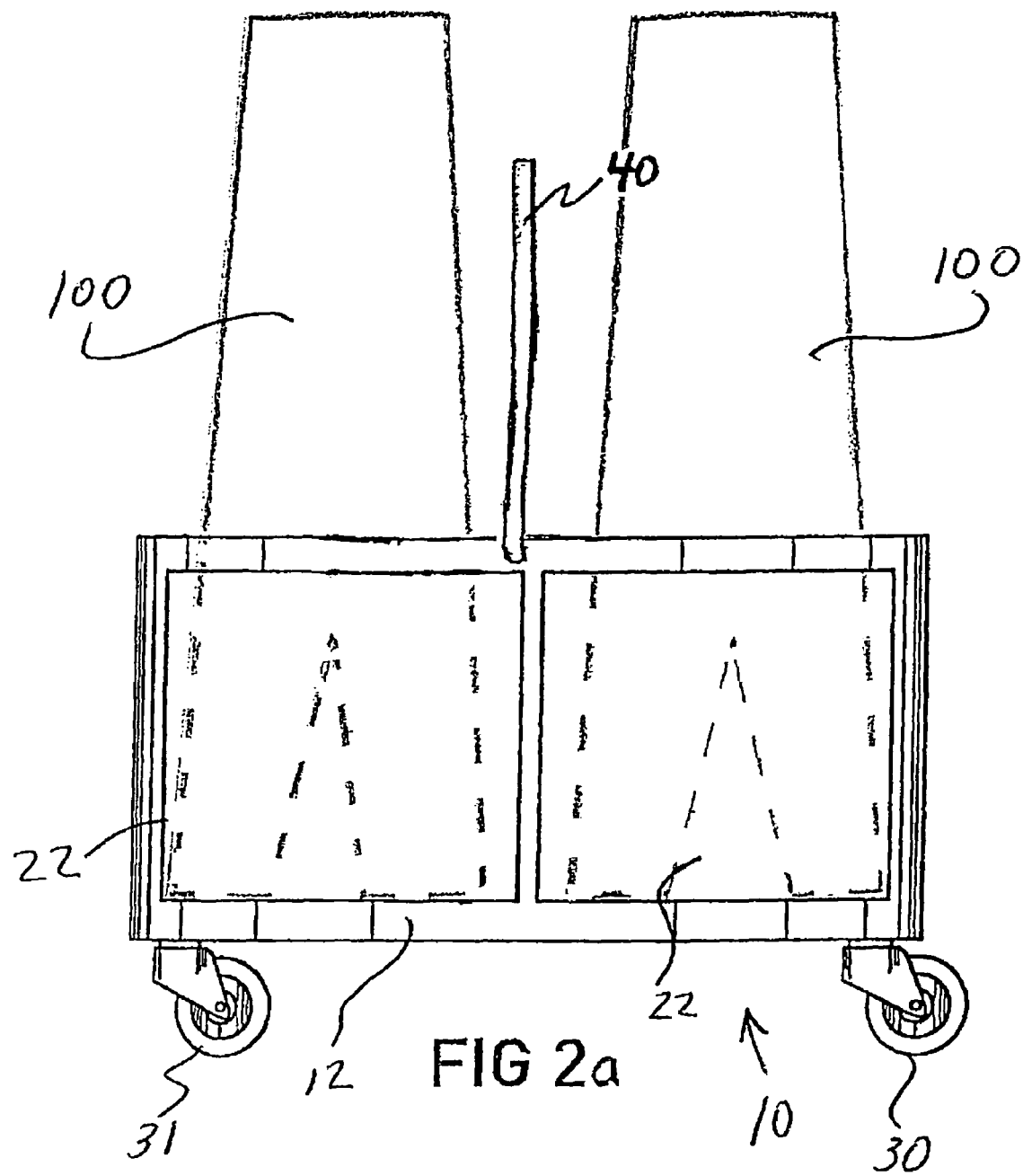

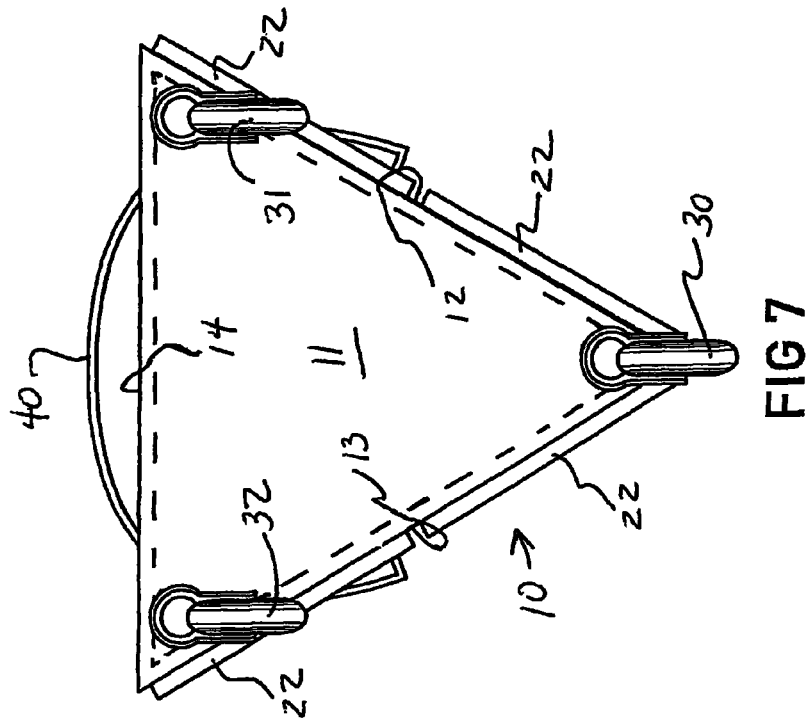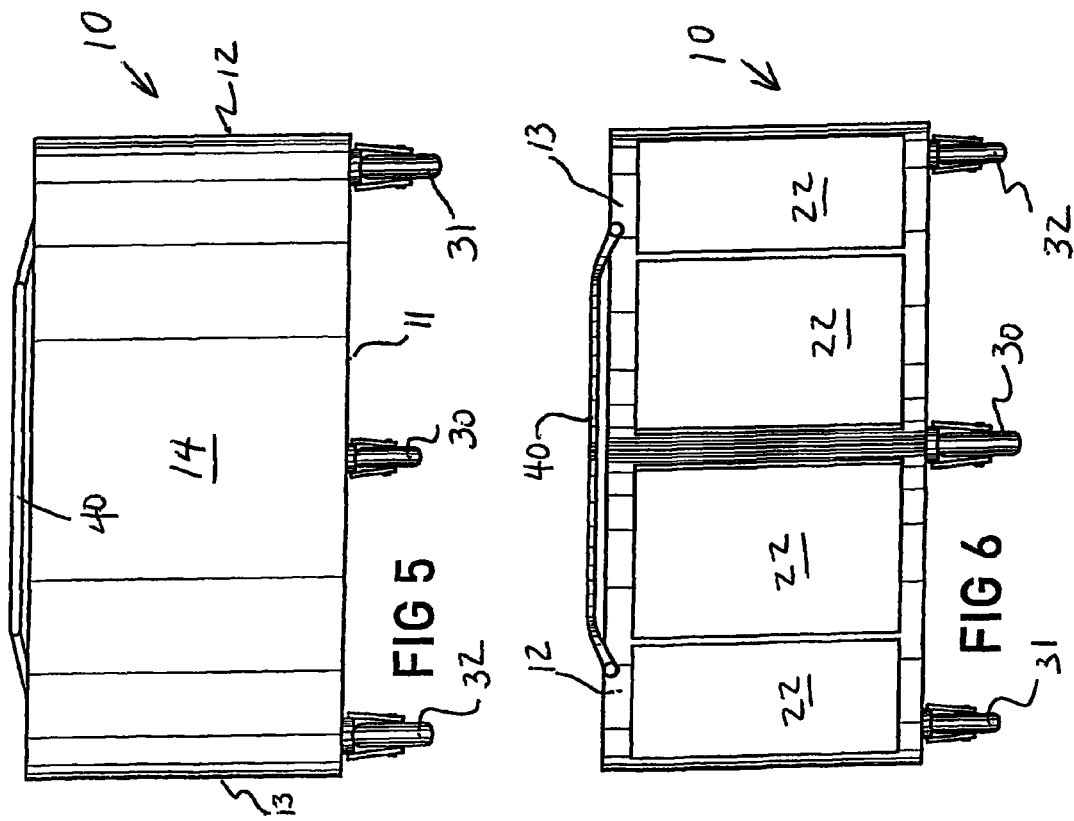

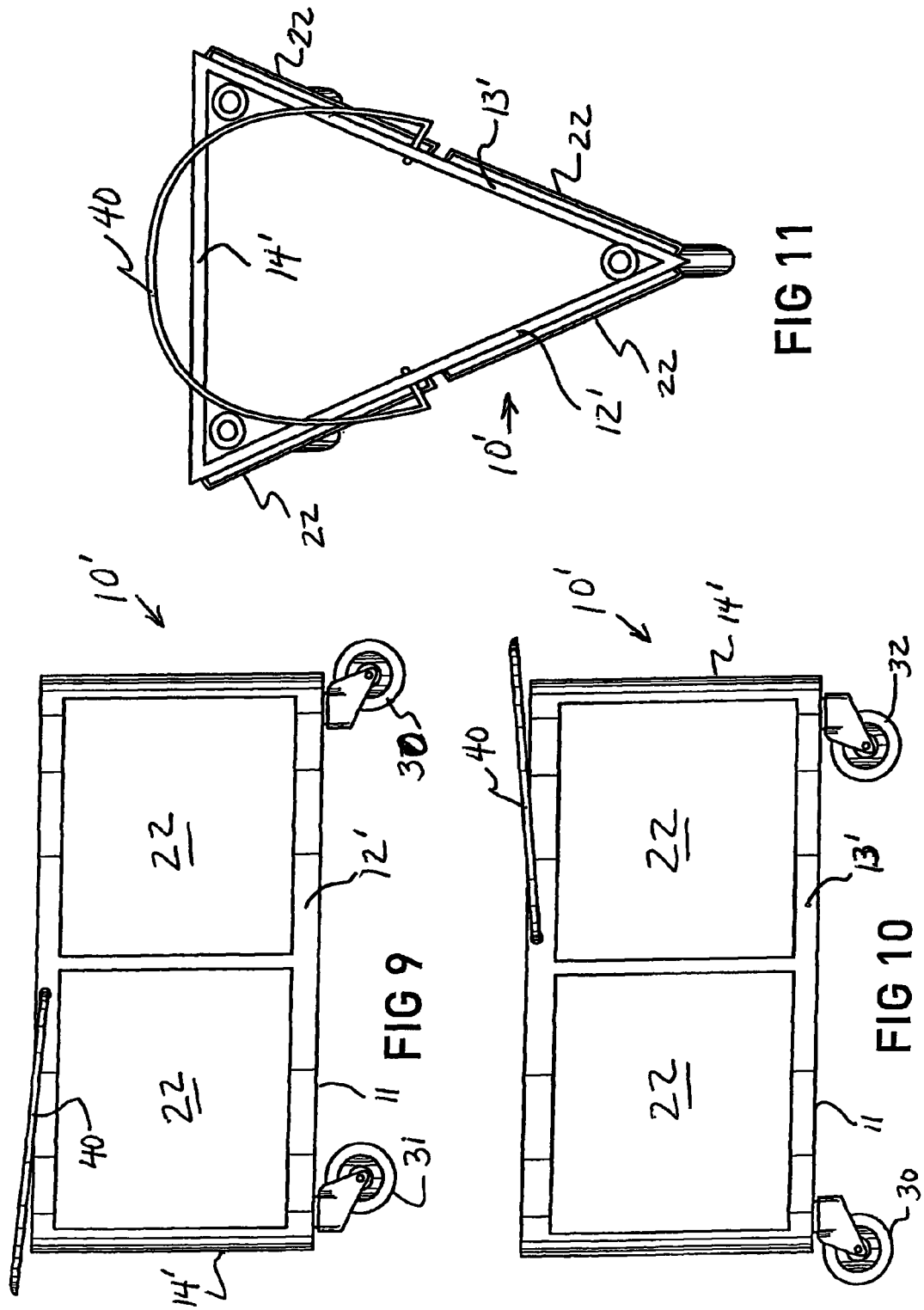

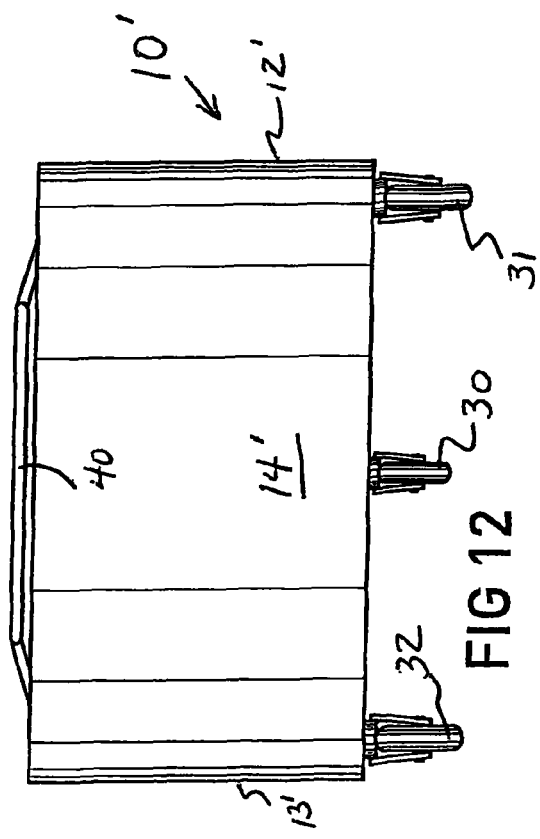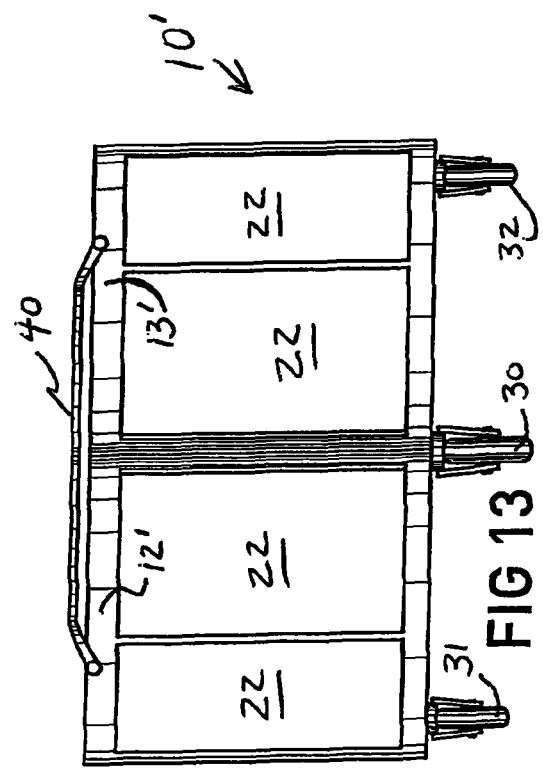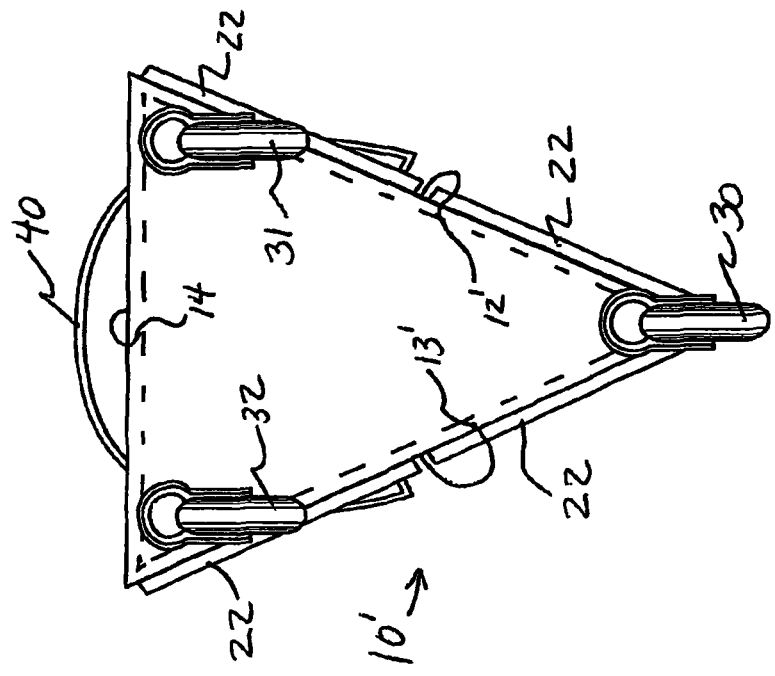

TRIANGULAR SHAPED BUCKET WITH RUST RESISTANT WHEELS

CROSS REFERENCE TO RELATED APPLICATIONS

The benefit under 35 U.S.C. §119(e) of U.S. Provisional Patent Application Ser. No. 61/397,581 filed on Jun. 14, 2010 is hereby claimed, and U.S. Provisional Patent Application Ser. No. 61/397,581 is incorporated herein by reference in its entirety.

BACKGROUND OF THE INVENTION

1. Field of the Invention

The invention relates to maintenance and janitorial equipment, and more particularly, to a bucket that may be moved from location to location and may store and transport warning signs (this is, "wet floor" signs) that indicate a floor is wet.

2. Brief Description of the Related Art

Equipment for holding and transporting cleaning items is commercially available. One example of a bucket having storage receptacles is shown in my U.S. Design patent 350,632 which was issued on Sep. 13, 1994. Cleaning supplies, such as for example, spray bottles, towels, brushes and sponges, as well as other cleaning items suited to the type of maintenance/cleaning to be performed, may be required to be carried from room to room, such as, in office complexes, hotels, schools and other buildings.

Often buckets are cumbersome to maneuver. Wheeled buckets have been constructed, but they generally are difficult to move when a quantity of water or cleaning solution is held in the bucket. In addition, the wheels may move over wet or treated surfaces (e.g., floors treated with cleaning solution) which may corrode the wheels or connectors attaching the wheels. After several uses, the traditional wheeled buckets may become very difficult to maneuver.

Another drawback with buckets is that the buckets must be moved with cleaning supplies and equipment, such as wet floor signs, mops, and other items. Generally, the items are carried as the bucket is pulled or pushed with a mop. However, often, supplies like wet floor signs may be misplaced between uses.

A need exists for an improved bucket device which is easy to maneuver and may be used to store and transport items, such as wet floor signs.

SUMMARY OF THE INVENTION

A bucket is provided having a storage component for storing items, in particular for storing wet floor signs. According to a preferred embodiment, the bucket is configured with one or more storage components provided on the exterior, so that the bucket may be used to contain water or other cleaning fluid.

A handle preferably is provided to facilitate repositioning the bucket when the bucket is in use.

According to preferred embodiments a mop wringer may be provided on the bucket to facilitate use of the bucket with floor mopping operations.

According to preferred embodiments, the bucket further provides specially configured construction for facilitating movement of the bucket, even when filled with water or cleaning solution. Preferred embodiments include wheels for moving the bucket and signage that may be held thereon.

Preferably, the bucket has a triangular configuration that defines a triangular interior volume. According to a preferred configuration, two side walls are provided and connect with a rear wall, and the walls are connected to a floor (e.g., a bottom wall) to form an enclosure.

A preferred construction of the bucket is designed for use in connection with floor cleaning applications, in particular, mopping.

The bucket is configured to provide holding and storage for signage, such as wet floor signs that are displayed after a floor has been cleaned.

The bucket may be used in connection with floor cleaning and preferably has storage or holding components that may be configured to hold and store signs, so that the signs may be held in a single place, generally with the bucket. The bucket also is constructed so that the signs, as well as the bucket and its contents, may be easily moved from place to place.

It is a common practice to place wet floor signs at locations where mopping or cleaning has been done so that those approaching the wet floor are warned of the potential danger of slippage. This practice is used especially when cleaning floors of a building, such as common areas of apartments, schools or offices. According to preferred embodiments, the present device is designed with one or more designated holders configured to hold one or more wet floor signs so that the signs may be readily transported to the cleaning location where they are used, and when the signs are not in use, they may be readily stored on the bucket, which guards against the signs being misplaced and/or lost when not in use.

These and other advantages are provided by my invention.

BRIEF DESCRIPTION OF THE DRAWING FIGURES

FIG. 2 is a left side view of the bucket of the invention shown in FIG. 1.

Figure 1:
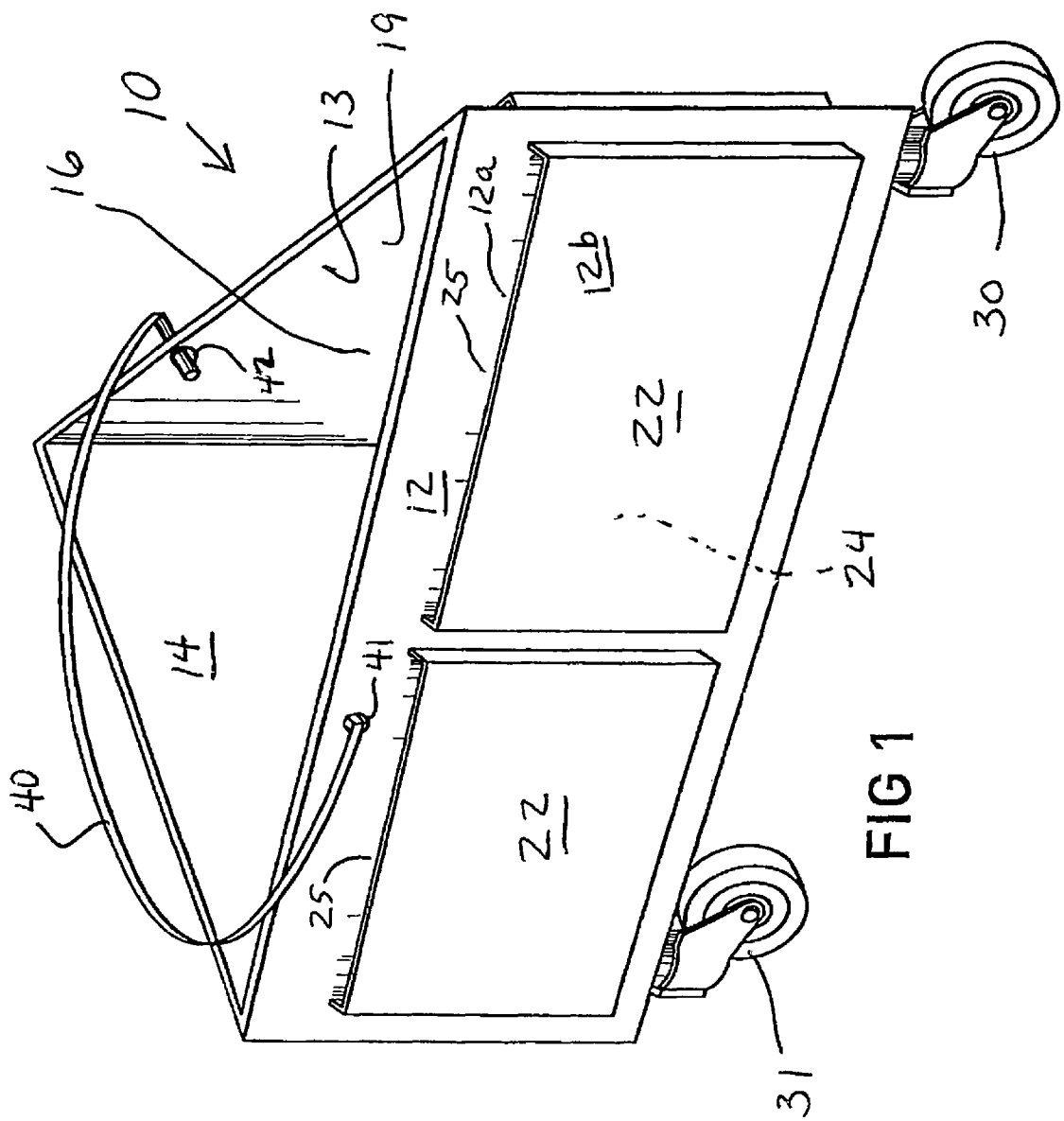
FIG. 1 is a view in perspective of a first embodiment of the bucket of the invention.

FIG. 2a is a left side of the bucket of FIG. 1, in which a wet floor warning sign 100 is held in each compartment 22 of the second side wall 13.

FIG. 3 is a right side view of the bucket of the invention shown in FIG. 1.

Figure 3A:
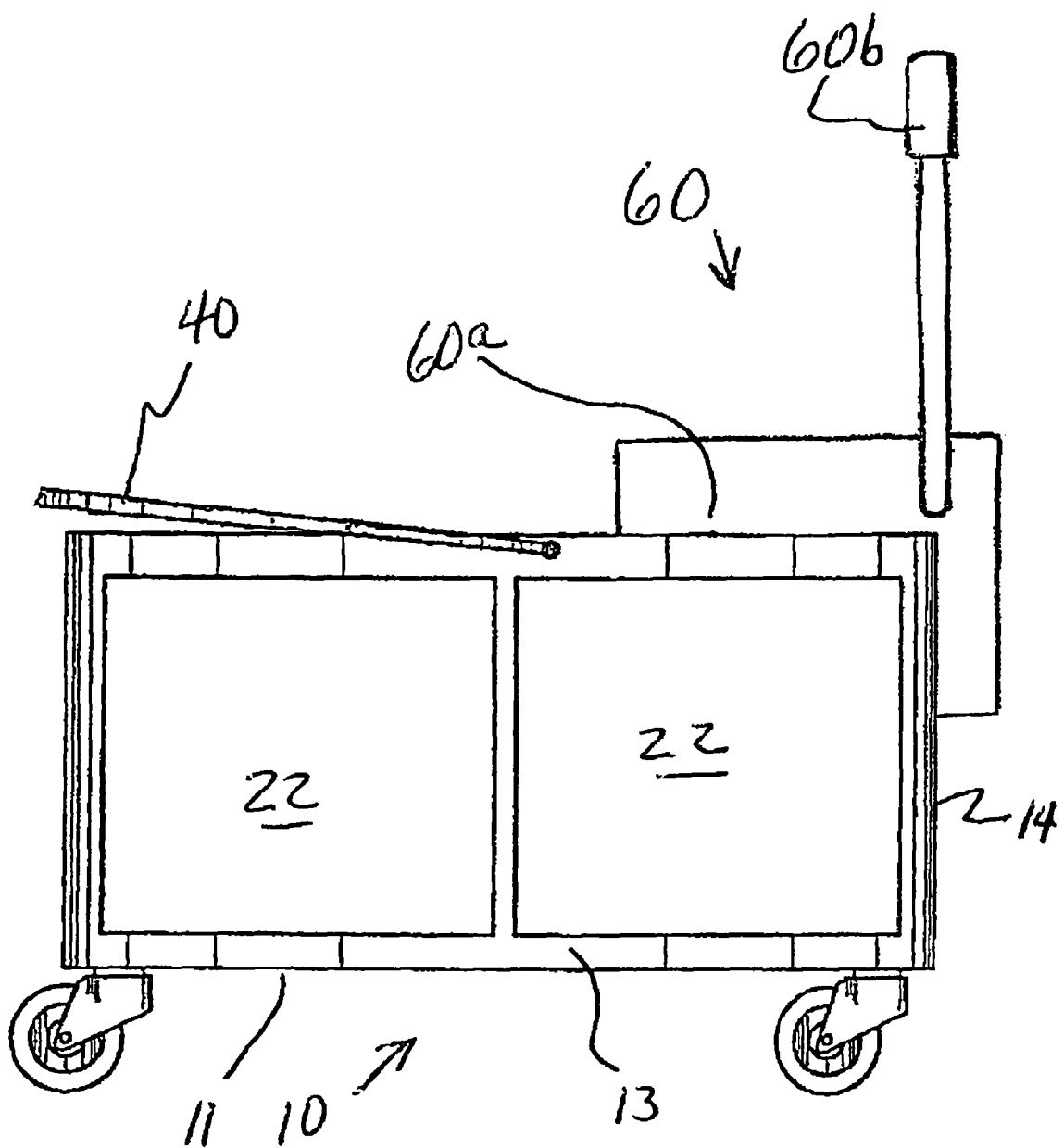

FIG. 3a is a right side view of the bucket of the invention shown in FIG. 1, in which a mop wringer (shown schematically) has been positioned on the bucket of the invention.

FIG. 4 is a view in top plan of the bucket of the invention shown in FIG. 1.

FIG. 5 is a back view of the bucket of the invention shown in FIG. 1.

FIG. 6 is a front view of the bucket of the invention shown in FIG. 1.

FIG. 7 is a view in bottom plan of the bucket of the invention shown in FIG. 1.

Figure 8:
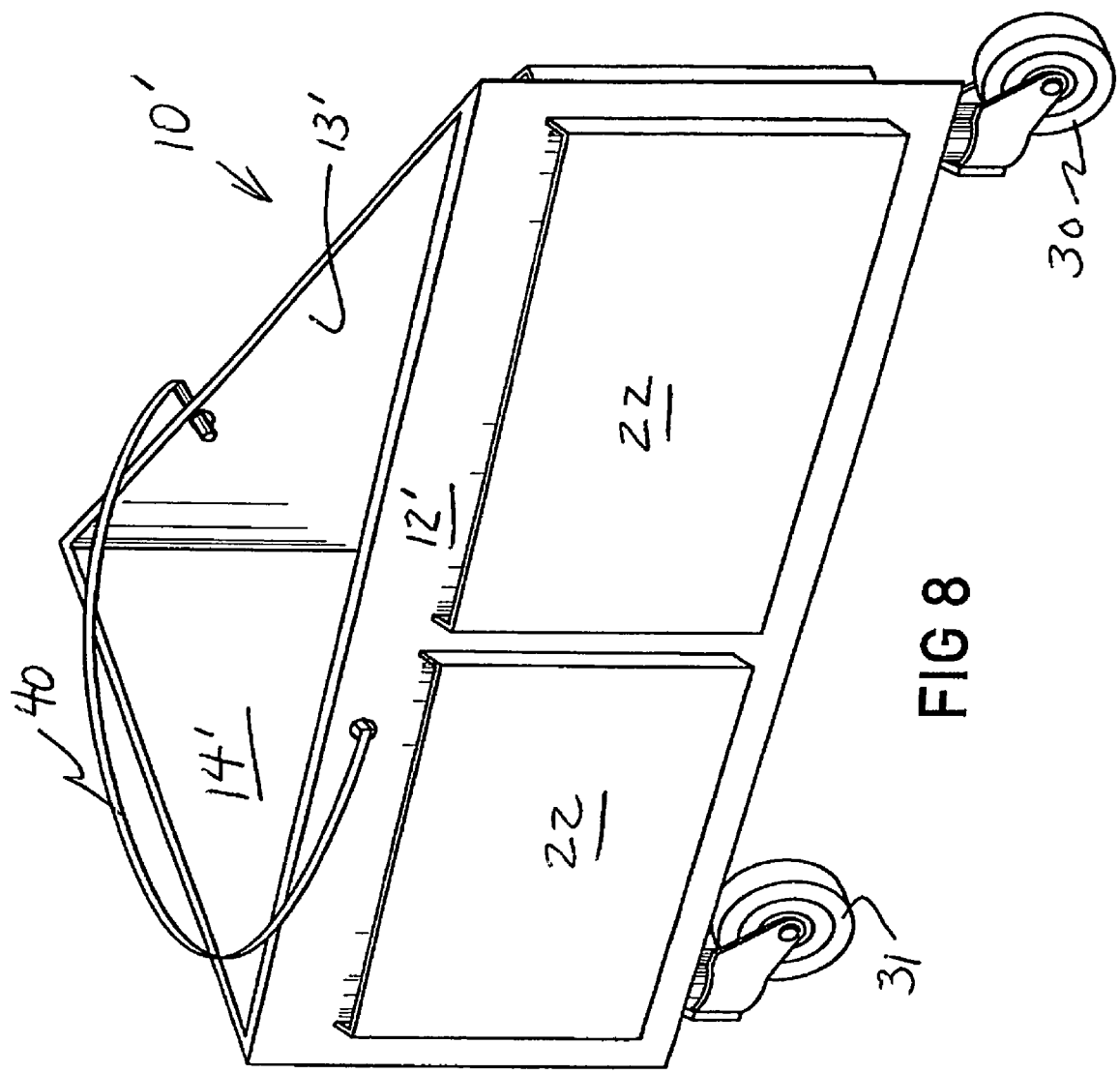

FIG. 8 is a view in perspective of an alternative embodiment of the bucket of the invention.

FIG. 9 is a left side view of the bucket of the invention shown in FIG. 8.

FIG. 10 is a right side view of the bucket of the invention shown in FIG. 8.

FIG. 11 is a view in top plan of the bucket of the invention shown in FIG. 8.

FIG. 12 is a back view of the bucket of the invention shown in FIG. 8.

FIG. 13 is a front view of the bucket of the invention shown in FIG. 8.

FIG. 14 is a view in bottom plan of the bucket of the invention shown in FIG. 8.

DETAILED DESCRIPTION OF THE PREFERRED EMBODIMENTS

Referring to FIGS. 1-8, there is illustrated a movable bucket 10 constructed in accordance with a preferred embodiment of my invention. The bucket 10 is configured having a floor 11, a first side wall 12, a second side wall 13, and a rear wall 14. Preferably, the side walls 12, 13 and rear wall 14 connect with the floor 11 to define a triangular volume 16 which defines a bucket space, that is, the interior space of the bucket 10 for holding wash water (which may include cleaning solutions) used for mopping floors. Preferably, one or both of the side walls 12, 13 are constructed to have a planar or substantially planar configuration. As illustrated in the preferred embodiment, the first side wall 12 is constructed having a generally planar surface portion 20. The first side wall 12 is shown provided with one or more compartments, such as the compartment 22 for holding signs, such as, for example, wet floor signs 100. The compartment 22 may be dimensioned to accommodate standard size wet floor signs. For example, one common size for wet floor signs is about 27 inches in height by about 11 inches in width. Generally wet floor signs 100 are comprised of two panels that may be folded or hinged together for storage, and unfolded for use (to form an a-frame configuration). Accordingly, preferred dimensions of the compartment 22 include an opening which will receive the sign width. Preferably, the sign length may be accommodated. According to one embodiment, the wet floor signs, such as that 100, may be stored on the bucket 10 by orienting the sign lengthwise so that the length of the sign is held laterally by the compartment 22.

According to a preferred embodiment, the compartment 22 may be constructed from a cavity formed in a side wall, such as the first side wall 12. The first side wall 12 may, for example, be constructed to form at least one common wall 12a of the bucket 10 that defines the triangular volume 16 of the bucket 10. The compartment 22 may be formed in part by at least one exterior wall portion 12b of the bucket 10 that is spaced from the common wall 12a that defines the triangular volume 16 of the interior space. Preferably, the bucket 10 is made from steel, a plastic, or a polymer. When the bucket is made from plastic or a polymer, preferably it is molded and each compartment 22 provided on the bucket 10 is formed by integrally molding it during the molding of the bucket 10 as a whole. The space 24 between the common wall 12a and the container exterior wall portion 12b defines a storage area of the compartment 22. According to a preferred construction, the storage compartment 22 may be provided with an opening 25 for insertion of one or more signs 100. The opening 25 opens into the storage area space 24 to provide access to the storage area space 24. According to a preferred embodiment, the storage compartment opening 25 may include a ramped portion disposed in the wall 12 (not shown) to facilitate directing a sign 100 into the compartment space 24.

In a preferred embodiment shown in FIGS. 1-8, the bucket 10 is provided with a pair of storage compartments 22 on each side wall 12 and 13.

For illustrative purposes, as shown in FIG. 1a, two signs 100 are shown held in the compartments 22 of the first side wall 12. Signs may also be held in the compartments 22 of the second side wall 13.

The bucket 10 is movable. Preferably, wheels 30, 31, 32 are provided to facilitate moving the bucket 10. The wheels 30, 31, 32 may be pivotally mounted so that they are able to pivot as the bucket 10 is moved so that the wheels 30, 31, 32 may align themselves in a direction that the bucket 10 is being transported. According to alternate embodiments, one or more wheels 30, 31, 32 may be pivotally mounted, while others may be fixed. For example, one preferred configuration includes a pivotally mounted front wheel 30 and fixedly mounted rear wheels 32, 33. An alternate configuration provides a fixed front wheel 30 and pivotally mounted rear wheels 32, 33. Optionally, one or more of the wheels 30, 31, 32 may be provided with a locking mechanism that may be actuated to lock a wheel in place, and consequently, release the lock when desired. Preferably, the wheels 30, 31, 32 are constructed from a corrosion and water resistant material which is not prone to rusting or being corroded by chemicals. The wheel mounting mechanism also is constructed from materials which are corrosion and/or rust resistant.

The bucket 10 preferably has a handle 40 which is connected to the first side wall 12 and second side wall 13. The handle 40 is pivotally connected to the side walls 12, 13, so that the handle 40 may be raised for grasping when the bucket 10 is to be moved, and may be lowered away from the bucket opening 19 when the bucket 10 interior volume 16 is to be accessed. Connectors, such as, for example, holes 41 and 42 in the side walls 12 and 13 through which the ends of the handle 40 extend, or a fastener, or pivot member, are preferably provided to mount the handle 40 to the side walls 12, 13. Alternately, the handle 40 may be snap fit, or installed on the bucket 10 by another suitable connection mechanism.

In a preferred embodiment of the invention, the side walls 12 and 13 and the rear wall 14 have a length of about 28 inches and a height of about 12 inches, and the compartments 22 have a length of about 13 inches and a height of about 10 inches.

According to preferred embodiments, the bucket 10 may be provided as a kit with one or more signs that are configured to correspond to the dimensions of the storage compartment 22, so that the signs may be stored therein.

The triangular shaped bucket 10 preferably provides at least one substantially planar side wall.

Preferably, the bucket 10 is constructed from materials which are water resistant, and also are resistant to general bathroom cleaners, such as typical cleaners used to clean toilets, glass, bathroom hardware and fixtures.

In a preferred embodiment of the invention shown in FIG. 3a, a mop wringer 60, such as Rubbermaid's mop bucket wringer (model no. RU6127) or the mop wringer of U.S. Pat. No. 4,047,261 (which are incorporated herein by reference) for example, may be provided on the bucket 10 by positioning the mop wringer 60 on the rear wall 14 of the bucket 10, with the main portion 60a of the mop wringer 60 residing in and above the triangular volume 16 of the bucket 10. A wet mop may be wrung out when desired by inserting the wet mop head into the mop wringer 60 and pulling on the mop wringer handle 60b to cause the mop wringer 60 to squeeze the mop head to wring out liquid (e.g., wash water) therefrom.

FIGS. 9 to 14 show an alternative embodiment of the invention. The bucket 10' shown in FIGS. 9 to 14 is substantially the same as the bucket 10 shown in FIGS. 1 to 8, except the walls 12', 13' and 14' of the bucket 10' when viewed in top plan form an isosceles triangle, rather than the equilateral triangle formed by walls 12, 13 and 14 of the bucket 10 when walls 12, 13 and 14 of bucket 10 are viewed in top plan.

While the invention has been described with reference to specific embodiments, the description is illustrative and is not to be construed as limiting the scope of the invention. For example, though not shown, the storage compartments described herein may be provided with a cover for covering the opening to the storage area. Various modifications and changes may occur to those skilled in the art without departing from the spirit and scope of the invention described herein and as defined by the appended claims.

What is claimed is:
1. A bucket comprising:
a walled enclosure defining a triangular volume; and
a holding feature for holding and storing signs;
wherein said walled enclosure comprises a rear wall and two side walls, said rear wall and side walls being joined together and connected to a base to define said triangular volume;
wherein said holding feature comprises at least one pocket said at least one pocket being disposed on one of the walls of the walled enclosure, the at least one pocket having a common wall with said one of the walls of the walled enclosure said at least one pocket is disposed on, an exterior wall spaced from the common wall, a pair of pocket side walls extending outwardly from the common wall and joining to the exterior wall, and a bottom extending outwardly from the common wall and joining to the exterior wall, thereby forming a storage area space of the pocket; and
wherein said at least one pocket having at least one opening therein for receiving one or more signs.

2. A triangular bucket comprising:
a) a first side wall;
b) a second side wall;
c) a rear wall;
d) a floor;
e) the rear wall, first side wall and second side wall being connected to each other and to the floor to form a triangular volume;
f) a compartment disposed on at least one of said first side wall and said second side wall for holding signs;
g) wherein said compartment for holding signs includes at least one inner side wall that is formed by said at least one of first side wall and said second side wall on which said compartment is disposed;
h) wherein said compartment includes a pair of compartment side walls that extend outwardly from said at least one inner side wall, said compartment side walls each having an inner edge and an outer edge, and wherein said inner edge of each said compartment sidewall is joined with said at least one inner side wall; and
i) wherein said compartment side walls are each disposed equi-distant over their length from said at least one of first side wall and said second side wall on which said compartment is disposed to provide a uniform pocket depth for facilitating movement of signs held in said compartment.

3. A kit for facilitating floor cleaning comprising:
a) the bucket of claim 1;
b) at least one sign.

4. The kit of claim 3, wherein said at least one sign comprises a wet floor sign having two panels that are foldable for storage and that may be unfolded for use.

5. The kit of claim 3, including a plurality of signs.

6. A kit for facilitating floor cleaning, comprising:
a) a bucket comprising:
a walled enclosure defining a triangular volume; and
a holding feature for holding and storing signs;
wherein said walled enclosure comprises a rear wall and two side walls, said rear wall and side walls being joined together and connected to a base to define said triangular volume;
wherein each said side wall has an inner surface and an outer surface;
wherein said holding feature comprises a plurality of pockets, said pockets being disposed on said outer surfaces of said side walls, each said pocket being formed from a first wall that consists essentially of the side wall outer surface, at least one additional wall portion extending outwardly from said side wall outer surface, and at least one bottom wall that is joined with said first wall and said at least one additional wall to form a said pocket;
said bottom wall comprising a pocket bottom for supporting said signs that are held therein; and
b) at least one sign;
wherein said at least one sign has dimensions of about 11 inches by about 27 inches.

7. The kit of claim 6, wherein said compartment has at least one opening therein for receiving one or more signs.

8. The kit of claim 6, wherein said compartment is formed in at least one side wall and forms with said side wall at least one common wall of said container that defines said triangular volume.

9. The kit of claim 8, wherein said compartment is formed in at least one side wall and forms at least one exterior container wall which is spaced from said common wall of said container that defines said triangular volume.

10. A bucket comprising:
a) three walls and a floor defining a container having a triangular volume therein;
b) means for moving the bucket;
c), at least one compartment formed in at least one of the three walls, said compartment having at least one opening therein for receiving one or more signs;
d) wherein said compartment forms with said at least one wall at least one common wall of said container that defines said triangular volume;
e) wherein said compartment forms an exterior container wall which is spaced from said common wall of said container that defines said triangular volume, said exterior container wall being spaced apart from and joined with said common wall by a pair of joining walls to provide a containment over the length of said compartment;
f) wherein said compartment has a bottom and wherein said compartment bottom comprises a containment to prevent liquid seepage from said pocket, said compartment bottom extending between said common wall of said container and the exterior container wall to define a floor for supporting the edges of signs thereon; and
g) wherein said common wall is a planar wall.

11. The bucket of claim 10 wherein the means for moving the bucket comprise wheels.

12. The bucket of claim 10, further including a storage compartment provided in at least one of said three walls for storing items therein.

13. The bucket of claim 12, wherein said wall in which said storage compartment is provided has an upper edge that defines a top edge of said bucket and at least one face that comprises an exterior of said bucket, and wherein said storage compartment opening is provided on said at least one face.

14. The device of claim 11, wherein the means for moving the bucket comprises wheels constructed from a material that resists corrosion from water and cleaning chemicals.

15. A bucket comprising:
a walled enclosure defining a triangular volume; and
a holding feature for holding and storing signs;

wherein said walled enclosure comprises a rear wall and two side walls, said rear wall and side walls being joined together and connected to a base to define said triangular volume:

wherein each said side wall has an inner surface and an outer surface;

wherein said holding feature comprises a plurality of pockets, said pockets being disposed on said outer surfaces of said side walls, each said pocket being formed from a first wall that consists essentially of the side wall outer surface, at least one additional wall portion extending outwardly from said side wall outer surface, and at least one bottom wall that is joined with said first wall and said at least one additional wall to form a said pocket;

said bottom wall comprising a pocket bottom for supporting said signs that are held therein;

wherein said pocket has a top end having an opening at said top end, and wherein said side wall portion forming said pocket is substantially closed with said bottom and said first wall outer surface to form a containment to prevent liquid seepage from said pocket;

wherein said at least one additional wall portion is disposed a distance from said side wall outer surface to space apart said first wall from said side wall outer surface to define a pocket depth; and wherein said pocket depth is continuous from top to bottom to secure an item therein.

16. The bucket of claim 2, wherein each said compartment side wall has a lower edge, and wherein said compartment includes a bottom wall portion; and wherein each side wall lower edge joins with said bottom wall portion.

17. A kit for facilitating floor cleaning, comprising:
a) a bucket comprising:
a) a walled enclosure defining a triangular volume; and
b) a holding feature for holding and storing signs;
c) wherein said walled enclosure comprises a rear wall and two side walls, said rear wall and side walls being joined together and connected to a base to define said triangular volume:
d) wherein each said side wall has an inner surface and an outer surface
e) wherein said holding feature comprises a plurality of pockets, said pockets being disposed on said outer surfaces of said side walls, each said pocket being formed from a first wall that consists essentially of the side wall outer surface, at least one additional wall portion extending outwardly from said side wall outer surface, and at least one bottom wall that is joined with said first wall and said at least one additional wall to form a said pocket;
f) said bottom wall comprising a pocket bottom for supporting said signs that are held therein; and
b) at least one sign;
wherein said at least one sign is dimensioned so that said sign may be placed in a said pocket and supported by said bottom.

18. A bucket comprising:
a walled enclosure defining a triangular volume; and
a holding feature for holding and storing signs;
wherein said walled enclosure comprises a rear wall and two side walls, said rear wall and side walls being joined together and connected to a base to define said triangular volume;
wherein each said side wall has an inner surface and an outer surface;
wherein said holding feature comprises a plurality of pockets, said pockets being disposed on said outer surfaces of said side walls, each said pocket being formed from a first wall that consists essentially of the side wall outer surface, at least one additional wall portion extending outwardly from said side wall outer surface, and at least one bottom wall that is joined with said first wall and said at least one additional wall to form a said pocket;
f) said bottom wall comprising a pocket bottom for supporting said signs that are held therein;
wherein said pocket is divided into a first portion and a second portion, wherein said first portion has a continuous pocket depth, and wherein said second portion includes a ramped portion to facilitate directing a sign into said compartment, said ramped portion being provided at the upper end of said pocket and the first portion of said pocket being located below said ramped portion.

19. The bucket of claim 11, comprising:
two compartments, including a first compartment and a second compartment, formed on the side wall,
wherein each said compartment has an outer side edge that is proximate to an edge of said bucket and an inner side edge that is disposed to face the inner side edge of the other compartment,
wherein said three walls defining said triangular volume each have a first side edge and a second side edge,
at least one wheel being disposed at each corner of said bucket;
wherein each said compartment outer side edge is disposed adjacent to said side edge of one of said three walls and above one of said wheels.

20. The bucket of claim 11, comprising:
two compartments, including a first compartment and a second compartment,
wherein said first compartment and said second compartment are disposed to cover a major portion of the surface of said common wall of said container that defines said triangular volume.

* * * * *